Figure 1:
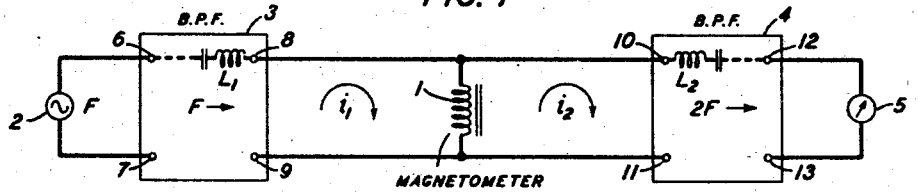

Sept. 7, 1948.  F. G. MERRILL  2,448,613
MAGNETIC DETECTOR
Filed May 16, 1947

INVENTOR
F. G. MERRILL
BY
Walter M. Hill
ATTORNEY

Patented Sept. 7, 1948

2,448,613

UNITED STATES PATENT OFFICE 2,448,613

MAGNETIC DETECTOR

Francis G. Merrill, Chatham, N. J., assignor to Bell Telephone Laboratories, Incorporated, New York, N. Y., a corporation of New York Application May 16, 1947, Serial No. 748,420

7 Claims. (Cl. 175—183)

This invention relates to magnetic detection systems and more particularly to improvements in the exciting or driving circuits of magnetometer systems of the type employing a magnetometer comprising a core of magnetic material having windings thereon energized from a source of alternating current of fundamental frequency to generate even order harmonic voltages in the windings proportional in magnitude to the strength of the magnetic field to be measured. Such a system has been disclosed in the copending patent application of T. Slonczewski, Serial No. 483,756, filed April 20, 1943.

In the above-mentioned copending application the circuits were carefully designed to permit the magnetometer to be excited only by a current of fundamental frequency. The detection circuits permitted only a relatively small even order harmonic current to flow through the observing circuit from the magnetometer element. To successfully operate such a system it is mandatory that the voltage of the exciting source be maintained with considerable constancy because in the general case the output signal is also proportional to the input voltage. It has now been discovered that if the third harmonic voltage generated by the magnetometer is permitted to freely circulate a third harmonic current through the magnetometer element, there is a material reduction in the even order harmonic response of the magnetometer to changes in the strength of the fundamental exciting current. This reduces the stability requirements imposed upon the exciting source. This discovery, therefore, makes it possible to eliminate much of the costly voltage regulating apparatus otherwise required to stabilize the output voltage of the exciting source, which is usually an oscillator. In the event it is desired to continue to use the elaborate voltage regulating apparatus, this discovery makes possible an increased accuracy in that the magnetometer is rendered substantially insensitive to any voltage variation that the closely regulated level control will permit the oscillator to produce.

It is the object of this invention to provide a circuit means permitting the ready flow through the magnetometer of not only the fundamental exciting current but also a current of third harmonic frequency, thereby rendering the magnetometer response substantially insensitive to exciting current variations.

The foregoing object is attained by this invention by providing a low impedance path for third harmonic currents, which path is effectively directly in shunt with a winding of the magnetometer of a system of the type described above.

Figure 2:
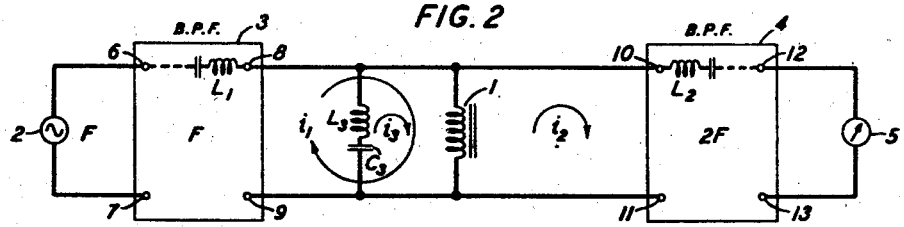
Figure 3:
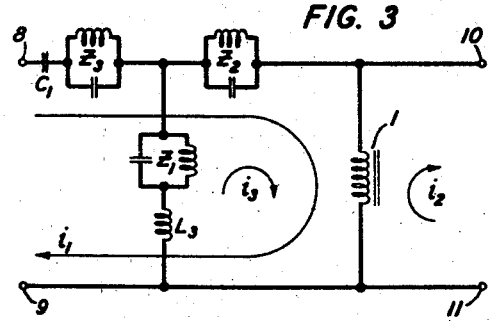
Figure 4:
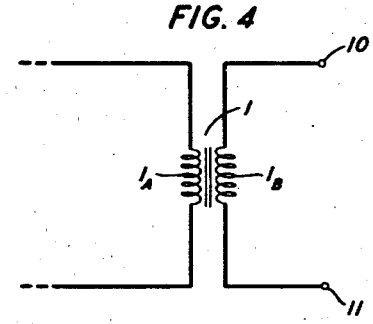
Figure 5:
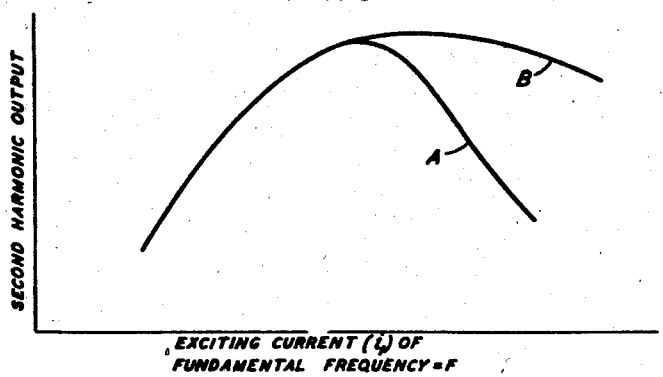

The invention may be better understood by referring to the accompanying drawings in which:

Fig. 1 discloses a magnetic detection system of the type to which this invention is applicable but energized in accordance with the disclosure in the aforesaid copending patent application;

Fig. 2 discloses an embodiment of the present invention in its simplest form;

Fig. 3 discloses a preferred embodment of the exciting networks connected between the two band-pass filters of Fig. 2;

Fig. 4 discloses an alternative two-winding magnetometer which may be substituted for the single winding magnetometer disclosed in the previous figures; and Fig. 5 discloses characteristic curves, experimentally obtained, graphically illustrating the advantages of this invention.

Referring now to Fig. 1, there is disclosed in elementary form a magnetic detection system of the type more particularly disclosed in the above-mentioned copending application of T. Slonczewski. In this figure the magnetometer 1 may comprise a length of magnetic material having wound thereon one or more windings. Only one winding is shown in this figure since a description in relation thereto is adequate for a complete understanding of the present invention. With respect to a plurality of windings it is sufficient to say that one of them may be used for exciting the magnetometer whereas one or more of the others may be employed for harmonic detection purposes. This is because the harmonics generated in the exciting winding are also generated in each of the other windings. This will be described in more detail in connection with Fig. 4.

The operation of this type of magnetometer element is based on the properties exhibited by magnetic material in a strong alternating magnetic field. The flux in an increasing magnetic field is proportional to the strength of the field only up to a certain critical value of field. Beyond that value the flux increases very slowly. If then a strong sinusoidal current is sent from a high impedance source through a coil with a magnetic core the flux in the core and therefore the voltage across the coil will not be sinusoidal. It will have frequency components which are harmonics of the driving frequency. In the absence of any exterior field this distortion will be symmetrical and will contain only odd harmonics of the driving frequency. If, however, a flux induced by a unidirectional magnetic field is also present the even order harmonics of the driving frequency will appear and their polarity will depend upon the direction of this flux. If the axis of the coil is maintained constantly in alignment with the earth's magnetic field, changes in that field from any cause will be indicated by changes in the strength of the even order harmonics.

In Fig. 1 the magnetometer 1 is excited by an alternating current of fundamental frequency F coming from a source of alternating current 2. The source 2 may comprise not only the fundamental frequency F but a number of harmonics. It is a prime essential, however, that the magnetometer 1 be excited only with a sinusoidal source of fundamental frequency. Consequently, a band-pass filter 3, the mid-frequency of which is equal to the fundamental frequency F, is inserted between the source 2 and the magnetometer 1. One of the even order harmonic currents, preferably the second harmonic of frequency 2F, is selected for detection by a band-pass filter 4 having its mid-frequency equal to the frequency 2F. This current of selected frequency is passed through utilization means 5 which is responsive to this frequency. This utilization means may be, for example, a meter circuit as schematically illustrated in Fig. 1.

In the system just described it was considered important that only currents of fundamental frequency be permitted to pass through the exciting winding of magnetometer 1. For this reason the right end section of filter 3 presents to the magnetometer an impedance high for all frequencies while the left end section of filter 4 also presents to the magnetometer 1 an impedance high for all frequencies. Obviously, the band-pass filter 3 must permit a flow of the current of fundamental frequency from the alternating current source 2 through the filter and the magnetometer 1. The source 2, however, was designed to have a fairly high impedance so that even for the fundamental frequency the filter 3 effectively presents a relatively high impedance to the magnetometer 1.

As previously stated, it has been discovered that a considerable improvement in the stability of this magnetometer system is achieved by also permitting currents of the third harmonic frequency generated in the magnetometer to circulate through it in addition, of course, to the fundamental exciting current. It has been found that by permitting this third harmonic current to circulate through the magnetometer to the exclusion of all others the detector is made considerably less sensitive to changes in the excitation voltage of the source of fundamental frequency. A circuit embodying the principles of this invention is disclosed in Fig. 2.

Referring to Fig. 2, it will be noted that the circuit is substantially identical with that shown in Fig. 1 except that a path of low impedance to third harmonic currents is connected in shunt with a magnetometer winding of the magnetometer 1. As in Fig. 1 the fundamental exciting current $i_1$ is indicated as passing through the winding of magnetometer 1 from the output terminals 8 and 9 of the fundamental frequency filter 3. Also as in Fig. 1 the relatively small second harmonic output current $i_2$ is shown passing through the magnetometer winding to input terminals 10 and 11 of the second harmonic filter 4. In addition to these two currents a third harmonic current $i_3$ is indicated as flowing through the magnetometer winding and the low impedance series-resonant shunt path provided by inductor $L_3$ and capacitor $C_3$. The impedance of this path is relatively large for either the fundamental or second harmonic frequency. It should be kept clearly in mind that the exciting current coming from the high impedance source of alternating current 2 of fundamental frequency F passes into the band-pass filter 3 at its input terminals 6 and 7 and readily passes through this filter to the magnetometer 1 by way of output terminals 8 and 9. This band-pass filter rejects all harmonic frequencies coming from source 2. The second harmonic current $i_2$, generated by the magnetometer 1 in response to a unidirectional magnetic field imposed upon it, is impressed on the input terminals 10 and 11 of the second harmonic filter 4, readily passes therethrough and emerges from its output terminals 12 and 13 and is transmitted to the utilization device 5. The right end section of fundamental frequency filter 3 has a series-connected inductor $L_1$ and is preferably, although not necessarily, series tuned with a capacitor to the fundamental frequency. Similarly, the left end section of second harmonic filter 4 contains an inductor $L_2$ which also is preferably, although not necessarily, series resonant with the capacitor shown. In order to practice this invention it is essential, however, that the shunt path comprising inductor $L_3$ and capacitor $C_3$ provide a low impedance path for third harmonic currents but a high impedance path to all other frequencies.

Fig. 3 shows a preferred form of network to be connected in Fig. 2 between the output terminals 8 and 9 of fundamental frequency filter 3 and the input terminals 10 and 11 of the second harmonic filter 4. The magnetometer is again represented by a single coil device 1. A series path is provided for the exciting current of fundamental frequency $i_1$ through a capacitor $C_1$ and antiresonant networks $Z_3$ and $Z_2$. These two antiresonant networks are respectively tuned to the third harmonic and second harmonic frequencies. While capacitor $C_1$ is not essential, it is desirable in that it may provide a series resonance with the equivalent inductance of the two antiresonant networks $Z_3$ and $Z_2$ for the exciting current of fundamental frequency. It is a well-known fact that an antiresonant network tuned to a given frequency will appear as an inductive reactance for lower frequencies and as a capacitive reactance for higher frequencies. Since these two networks are each tuned to frequencies higher than the fundamental frequency they will both appear as inductive reactances at the fundamental frequency. Therefore, they may be tuned to series resonance by a capacitor $C_1$. It is to be understood, however, that even if capacitor $C_1$ is not provided, these two networks will still provide a relatively low impedance path at the fundamental frequency.

The third harmonic shunt path is provided by an inductor $L_3$ and an antiresonant impedance network $Z_1$ connected in series with the antiresonant impedance $Z_2$. This path, therefore, is connected directly across the winding of the magnetometer 1. The antiresonant network $Z_1$ renders the shunt path essentially infinite impedance to currents of fundamental frequency. However, as previously stated, this network will appear as a capacitive reactance to currents of third harmonic frequency, and together with the equivalent capacitive reactance of network $Z_2$, it is tuned to series resonance with the third harmonic by the inductor $L_3$. Therefore, a path of very low impedance to currents of third harmonic frequency is provided in shunt with a winding of the magnetometer I.

While it has been stated that the low impedance third harmonic shunt path should be connected directly across a winding of the magnetometer I, it is obvious that the insertion of a large capacitance (not shown) in series with this path is the equivalent of the direct connection shown. This is also true on the output side of the magnetometer carrying currents of second harmonic frequency.

The circuits of Fig. 3 as thus described evidently disclose particularly good discrimination against currents of unwanted frequency in the several paths. For example, capacitor $C_1$ tuned to series resonance with the equivalent inductance of series-connected antiresonant networks $Z_3$ and $Z_2$ provides a low impedance path for the current of fundamental frequency in order to excite magnetometer I. However, the current of second harmonic frequency coming from magnetometer I is excluded from the shunt path and also from the source by the antiresonant network $Z_2$. The current of fundamental frequency is also substantially eliminated from the shunt path by reason of the antiresonant network $Z_1$ tuned to that frequency. Again, the current of third harmonic frequency, while readily passing through the series network of inductor $L_3$ and antiresonant networks $Z_1$ and $Z_2$, is effectively excluded from the source by reason of the antiresonant network $Z_3$.

Fig. 4 discloses an alternative arrangement for the magnetometer itself. It is evident that a magnetometer having more than one winding may be employed. This figure shows how a magnetometer with two windings, $I_A$ and $I_B$ respectively, may be employed and is connected in either Fig. 2 or Fig. 3 by simply connecting one of the windings, for example winding $I_B$, to the input terminals 10 and 11 of filter 4. The connections to the terminals of windings $I_A$ are then obvious by merely referring to either Fig. 2 or Fig. 3.

The peculiar advantage of this invention is best illustrated by comparing the performance characteristics of the magnetometer circuit of Fig. 1 with the magnetometer circuit of this invention as disclosed in either Fig. 2 or Fig. 3. The curves shown in Fig. 5 were experimentally obtained and are characteristics of the second harmonic output plotted against the exciting current of fundamental frequency. Curve A represents the characteristics derived from the circuit of Fig. 1 without the benefit of the third harmonic shunt provided by this invention. It is evident that the second harmonic output may vary quite rapidly with changes in the exciting current. However, with the use of the third harmonic shunt as taught by this invention, the curve B of Fig. 5 is obtained. This curve shows a considerably reduced sensitivity to changes in exciting current. A considerable range of exciting current may be tolerated with a very small change in second harmonic output as compared with the change in second harmonic output shown by curve A.

It is apparent that, in accordance with the teachings of this invention, if the currents through the magnetometer are restricted to the exciting current of fundamental frequency and the circulating current of third harmonic frequency provided by a shunt path of low impedance to that frequency, greatly improved results are achieved.

It is also pointed out as obvious that various combinations of the individual networks shown in Fig. 3 may be employed to provide varying degrees of operative circuits embodying this invention. For example, as already stated, capacitor $C_1$ need not necessarily be used to provide an operative circuit, although it is preferred that it be used. It is also evident that the third harmonic antiresonant network $Z_3$ may be employed in combination with the series resonant network $L_3$ and $C_3$ shown in Fig. 2. It is also obvious that capacitor $C_1$ in combination with third harmonic antiresonant network $Z_3$ may be employed together with the shunt path $L_3$ and $C_3$ of Fig. 2. In this case capacitor $C_1$ would be tuned to series resonance with the inductive reactance of antiresonant network $Z_3$ so as to pass most readily currents of fundamental frequency for excitation of the magnetometer. A still further obvious modification would simply be to substitute the antiresonant network $Z_1$ and inductor $L_3$ of Fig. 3 for the inductor $L_3$ and capacitor $C_3$ of Fig. 2. In this case the inductor $L_3$ would tune the equivalent capacitance of the antiresonant network $Z_1$ to currents of third harmonic frequency.

Additional modifications of a similar character are obvious to any one skilled in the art. In each and every case there is provided, in accordance with the teachings of this invention, a low impedance third harmonic shunt path to circulate the third harmonic current through a winding of the magnetometer. Aside from the transmission of the fundamental frequency exciting current, no other currents are permitted to circulate through the magnetometer, it being understood of course that the second harmonic or other even order harmonic current selected for detection is kept relatively very low by reason of a high impedance output circuit.

What is claimed is:

1. In a magnetic detecting system, the circuits comprising a source of alternating current of fundamental frequency, a magnetometer having at least one winding thereon, a filter connecting said source to a winding on the magnetometer, said filter passing most readily only currents of fundamental frequency, utilization means responsive to a selected even order harmonic voltage generated in said magnetometer, a second filter connecting the utilization means directly across a winding on the magnetometer, said second filter passing most readily only currents of the selected even order harmonic frequency, and a frequency selective shunt path connected directly across a winding of the magnetometer, said path passing most readily only currents of third harmonic frequency generated by the magnetometer, whereby the selected even order harmonic output voltage of the magnetometer is rendered less sensitive to changes in the excitation voltage of said source of fundamental frequency.

2. The combination in accordance with claim 1 wherein said filter, said second filter and said frequency selective shunt path each includes a series resonant network tuned to the fundamental, second harmonic and third harmonic respectively.

3. The combination in accordance with claim 1 wherein said filter includes a network series resonant to the fundamental frequency connected in series with an antiresonant network tuned to the third harmonic frequency, and said second filter and said frequency selective shunt path each includes a series resonant network tuned to the second harmonic and third harmonic respectively.

4. The combination in accordance with claim 3 and a capacitor also connected in series with the third harmonic antiresonant network to tune the equivalent inductance thereof to series resonance with the fundamental frequency.

5. The combination in accordance with claim 1 wherein said frequency selective shunt path comprises an antiresonant network in series with an inductor, said network being tuned to the fundamental frequency, and said inductor having an inductance capable of tuning the equivalent capacitance of said network to series resonance with the third harmonic frequency.

6. In a magnetic detecting system, the circuits comprising a source of alternating current of fundamental frequency, a magnetometer having at least one winding thereon, a circuit connecting said source in series with a winding on the magnetometer, said circuit comprising in series two anti-resonant networks tuned to the second and third harmonics, respectively, the second harmonic network being connected directly to one terminal of the winding, utilization means responsive to a selected even order harmonic voltage generated in said magnetometer, a second filter connecting the utilization means directly across a winding on the magnetometer, said second filter passing most readily only currents of the selected even order harmonic frequency, and a frequency selective circuit connected between the junction of said two series-connected antiresonant networks and the other terminal of the winding to which said second harmonic network is connected, said frequency selective circuit comprising an antiresonant network tuned to the fundamental frequency connected in series with an inductor, the inductor being series resonant at the third harmonic frequency with the equivalent capacitance of the fundamental and the second harmonic antiresonant networks, thereby providing a low impedance shunt path for the third harmonic current directly across said winding of the magnetometer, whereby the selected even order harmonic output voltage of the magnetometer is rendered less sensitive to changes in the excitation voltage of said source of fundamental frequency.

7. The combination in accordance with claim 6 and a capacitor connected in series with said third harmonic antiresonant network for tuning the equivalent inductance of said second and third harmonic networks to series resonance at the fundamental frequency.

FRANCIS G. MERRILL.